United States Patent
Alizadeh-Shabdiz et al.

(10) Patent No.: US 7,916,661 B2
(45) Date of Patent: *Mar. 29, 2011

(54) ESTIMATION OF POSITION USING WLAN ACCESS POINT RADIO PROPAGATION CHARACTERISTICS IN A WLAN POSITIONING SYSTEM

(75) Inventors: Farshid Alizadeh-Shabdiz, Wayland, MA (US); Kaveh Pahlavan, Newton, MA (US)

(73) Assignee: Skyhook Wireless, Inc., Boston, MA (US)

( * ) Notice: Subject to any disclaimer, the term of this patent is extended or adjusted under 35 U.S.C. 154(b) by 130 days.

This patent is subject to a terminal disclaimer.

(21) Appl. No.: 12/392,621

(22) Filed: Feb. 25, 2009

(65) Prior Publication Data

US 2009/0154371 A1    Jun. 18, 2009

Related U.S. Application Data

(63) Continuation of application No. 11/430,222, filed on May 8, 2006, now Pat. No. 7,515,578.

(51) Int. Cl.
*H04L 12/26* (2006.01)
*H04W 4/00* (2009.01)

(52) U.S. Cl. ........................... 370/252; 370/338

(58) Field of Classification Search .............. 370/338, 370/310, 328; 455/456.1, 456.2, 41.2, 522
See application file for complete search history.

(56) References Cited

U.S. PATENT DOCUMENTS

| | | | |
|---|---|---|---|
| 7,123,928 B2 | 10/2006 | Moeglein et al. | |
| 7,305,245 B2 | 12/2007 | Alizadeh-Shabdiz et al. | |
| 7,397,424 B2 | 7/2008 | Houri | |
| 7,403,762 B2 | 7/2008 | Morgan et al. | |
| 7,414,988 B2 | 8/2008 | Jones et al. | |
| 7,433,694 B2 | 10/2008 | Morgan et al. | |
| 7,433,696 B2 | 10/2008 | Dietrich et al. | |
| 7,471,954 B2 | 12/2008 | Brachet et al. | |

(Continued)

FOREIGN PATENT DOCUMENTS

EP    1612999 A1    1/2006

(Continued)

OTHER PUBLICATIONS

"Delta Encoding", Wikipedia, retrieved from <http://en.wikipedia.org/wiki/Delta_encoding>, on Mar. 1, 2006. (1 page).

(Continued)

*Primary Examiner* — Charles N Appiah
*Assistant Examiner* — Kiet Doan
(74) *Attorney, Agent, or Firm* — Wilmer Cutler Pickering Hale and Dorr LLP (57) ABSTRACT

A method for estimating position using WLAN access point radio propagation characteristics in a WLAN location based service is provided. A location-based services system has a plurality of Wi-Fi access points in a target area. The Wi-Fi access points are positioned at geographic locations and have signal coverage areas. A method of characterizing at least one of the Wi-Fi access points comprises determining the geographic location of the Wi-Fi access point, dividing the signal coverage area of the Wi-Fi access point into at least one section, and determining radio propagation characteristics for each section. The radio propagation characteristics of each section characterize a radio channel of the Wi-Fi access point, and the characterization can be used in a location algorithm.

22 Claims, 6 Drawing Sheets

U.S. PATENT DOCUMENTS

| | | | |
|---|---|---|---|
| 7,474,646 B2 * | 1/2009 | Tamaki | 370/338 |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 2002/0108371 A1 | 8/2002 | Rouse et al. | |
| 2003/0118015 A1 | 6/2003 | Gunnarsson et al. | |
| 2004/0057408 A1 | 3/2004 | Gray | |
| 2004/0203880 A1 | 10/2004 | Riley | |
| 2004/0203904 A1 | 10/2004 | Gwon et al. | |
| 2005/0003827 A1 | 1/2005 | Whelan | |
| 2005/0037775 A1 | 2/2005 | Moeglein et al. | |
| 2005/0073980 A1 | 4/2005 | Thomson et al. | |
| 2005/0192024 A1 | 9/2005 | Sheynblat | |
| 2005/0208919 A1 | 9/2005 | Walker et al. | |
| 2006/0009235 A1 | 1/2006 | Sheynblat et al. | |
| 2006/0072502 A1 | 4/2006 | Crandall et al. | |
| 2006/0095348 A1 | 5/2006 | Jones et al. | |
| 2006/0095349 A1 | 5/2006 | Morgan et al. | |
| 2006/0197704 A1 | 9/2006 | Luzzatto et al. | |
| 2006/0217131 A1 | 9/2006 | Alizadeh-Shabdiz et al. | |
| 2006/0229088 A1 | 10/2006 | Walter | |
| 2007/0004428 A1 | 1/2007 | Morgan et al. | |
| 2007/0018891 A1 | 1/2007 | Golden et al. | |
| 2007/0121560 A1 | 5/2007 | Edge | |
| 2007/0126635 A1 | 6/2007 | Houri | |
| 2007/0150516 A1 | 6/2007 | Morgan et al. | |
| 2007/0258408 A1 | 11/2007 | Alizadeh-Shabdiz et al. | |
| 2007/0258420 A1 | 11/2007 | Alizadeh-Shabdiz et al. | |
| 2007/0259624 A1 | 11/2007 | Alizadeh-Shabdiz et al. | |
| 2008/0008117 A1 | 1/2008 | Alizadeh-Shabdiz | |
| 2008/0008118 A1 | 1/2008 | Alizadeh-Shabdiz | |
| 2008/0008119 A1 | 1/2008 | Alizadeh-Shabdiz | |
| 2008/0008120 A1 | 1/2008 | Alizadeh-Shabdiz | |
| 2008/0008121 A1 | 1/2008 | Alizadeh-Shabdiz | |
| 2008/0033646 A1 | 2/2008 | Morgan et al. | |
| 2008/0108319 A1 | 5/2008 | Gallagher | |
| 2008/0108371 A1 | 5/2008 | Alizadeh-Shabdiz et al. | |
| 2008/0132170 A1 | 6/2008 | Alizadeh-Shabdiz et al. | |
| 2008/0139217 A1 | 6/2008 | Alizadeh-Shabdiz et al. | |
| 2008/0176583 A1 | 7/2008 | Brachet et al. | |
| 2008/0248741 A1 | 10/2008 | Alizadeh-Shabdiz | |
| 2008/0248808 A1 | 10/2008 | Alizadeh-Shabdiz | |
| 2009/0075672 A1 | 3/2009 | Jones et al. | |
| 2009/0149197 A1 | 6/2009 | Morgan et al. | |
| 2009/0154371 A1 | 6/2009 | Alizadeh-Shabdiz et al. | |
| 2009/0175189 A1 | 7/2009 | Alizadeh-Shabdiz et al. | |
| 2009/0252138 A1 | 10/2009 | Alizadeh-Shabdiz et al. | |
| 2009/0303112 A1 | 12/2009 | Alizadeh-Shabdiz | |
| 2009/0303113 A1 | 12/2009 | Alizadeh-Shabdiz | |
| 2009/0303114 A1 | 12/2009 | Alizadeh-Shabdiz | |
| 2009/0303115 A1 | 12/2009 | Alizadeh-Shabdiz | |
| 2009/0303119 A1 | 12/2009 | Alizadeh-Shabdiz | |
| 2009/0303120 A1 | 12/2009 | Alizadeh-Shabdiz | |
| 2009/0303121 A1 | 12/2009 | Alizadeh-Shabdiz | |
| 2009/0310585 A1 | 12/2009 | Alizadeh-Shabdiz | |
| 2009/0312035 A1 | 12/2009 | Alizadeh-Shabdiz | |
| 2009/0312036 A1 | 12/2009 | Alizadeh-Shabdiz | |
| 2010/0052983 A1 | 3/2010 | Alizadeh-Shabdiz | |

FOREIGN PATENT DOCUMENTS

| | | |
|---|---|---|
| WO | WO-03102620 A1 | 12/2003 |
| WO | WO-2005/121829 A1 | 12/2005 |
| WO | WO-2006/070211 A1 | 7/2006 |
| WO | WO-2006/117587 A1 | 11/2006 |
| WO | WO-2007/0133967 | 11/2007 |
| WO | WO-2007/133968 | 11/2007 |
| WO | WO-2008/057737 | 5/2008 |

OTHER PUBLICATIONS

"Terminal Equipment and Protocols for Telematic Services: Information Technology-Digital Compression and Coding of Continuous-Tome Still Images—Requirements and Guidelines," International Telecommunication Union, Sep. 1992.

Griswold et al., "ActiveCampus—Sustaining Educational Communities through Mobile Technology." UCSD CSE Technical Report #CS200-0714, 2002. (19 pages).

Hazas, M., et al., "Location-Aware Computing Comes of Age," IEEE, vol. 37, Feb. 2004.

Hellebrandt, M., et al., "Estimating Position and Velocity of Mobile in a Cellular Radio Network," IEEE Transactions on Vehicular Technology, vol. 46, No. 1, Feb. 1997.

http://mathworld.wolfram.com/ChinesePostmanProblem.html.

International Search Report and Written Opinion, International Patent Application No. PCT/US07/68248, mailed Aug. 6, 2008 (6 pages).

Kawabata, K. et al., "Estimating Velocity Using Diversity Reception," IEEE, 1994. (371-374).

Kim, M., et al., "Risks of using AP locations discovered through war driving,"; Pervasive Computing; May 19, 2006; p. 67-81 (15 pages).

Kirsner, S., "One more way to find yourself," The Boston Globe, May 23, 2005, Retrieved from www.boston.com.

Krumm, J., et al., "LOCADIO: Inferring Motion and Location from Wi-Fi Signal Strengths," First Annual International Conference on Mobile and Ubiquitous Systems: Networking and Services, Aug. 2004.

Kwan, M., "Graphic Programming Using Odd or Even Points," Chinese Math. 1, 1960. (273-277).

LaMarca, A., et al., "Place Lab: Device Positioning Using Radio Beacons in the Wild," Pervasive Computing; May 3, 2005; p. 116-133; (18 pages).

Muthukrishnan, K., et al., "Towards Smart Surroundings: Enabling Techniques and Technologies for Localization," Lecture Notes in Computer Science, vol. 3479, May 2005, 11 pages.

Wikipedia entry for "Huffman coding," http://en.wikipedia.org, 2006.

Supplemental European Search Report and Written Opinion for EP07783288 dated Jun. 3, 2010, 7 pages.

European Search Report for European Application No. 07868513, dated Jun. 7, 2010, 5 pages.

International Search Report and Written Opinion of the International Searching Authority, the United States Patent and Trademark Office, for International Application No. PCT/US2007/068251, mailing date of Aug. 25, 2008, 6 pages.

International Search Report and Written Opinion of the International Searching Authority, the United States Patent and Trademark Office, for International Application No. PCT/US2010/041279, mailing date of Sep. 1, 2010, 7 pages.

International Search Report, International Patent Application No. PCT/US07/81929, mailed Apr. 16, 2008 (2 pages).

Supplementary European Search Report and Written Opinion for EP07761894, dated Jun. 3, 2010, 8 pages.

\* cited by examiner

ESTIMATION OF POSITION USING WLAN ACCESS POINT RADIO PROPAGATION CHARACTERISTICS IN A WLAN POSITIONING SYSTEM

CROSS-REFERENCE TO RELATED APPLICATIONS

This application is a continuation of and claims priority under 35 U.S.C. §120 to U.S. patent application Ser. No. 11/430,222, filed on May 8, 2006, entitled Estimation of Position Using WLAN Access Point Radio Propagation Characteristics in a WLAN Positioning System, the entire contents of which are incorporated herein by reference.

This application is related to the following applications U.S. patent applications:

U.S. patent application Ser. No. 11/430,079, filed May 8, 2006 and entitled "Estimation of Speed and Direction of Travel In A WLAN Positioning System;"

U.S. patent application Ser. No. 11/439,862, filed May 8, 2006 and entitled "Estimation of Speed of Travel Using the Dynamic Signal Strength Variation of Multiple WLAN Access Points;"

U.S. patent application Ser. No. 11/430,064, filed May 8, 2006 and entitled "Estimation of Speed and Direction of Travel In a WLAN Positioning System Using Multiple Position Estimations;" and U.S. patent application Ser. No. 11/430,224, filed May 8, 2006 and entitled "Calculation of Quality of WLAN Access Point Characterization For Use in a WLAN Positioning System."

the contents of which are hereby incorporated by reference.

BACKGROUND

1. Field of the Invention

The invention generally relates to positioning systems and, more specifically, to methods and systems of estimating attributes of user movement (e.g., position, speed, and direction) using WLAN access point radio propagation characteristics in a WLAN positioning system.

2. Discussion of Related Art

Position determination is the main component of navigation systems and any Location Based Services (LBS). Proliferation of WLAN access points in recent years created a blanket of WLAN radio waves everywhere. Therefore, almost in any place, there is a great possibility of detecting WLAN radio waves, especially in urban areas. The exponential growth of WLAN, and the fact that they can be found almost everywhere, initiated an idea of leveraging them for a metropolitan positioning system for indoor and outdoor areas. In a metropolitan WLAN positioning system, location of WLAN access points are used as reference points, and the Received Signal Strength (RSS) of a WLAN access point is used as an indicator of a distance of an end user from the WLAN access points that the user detects at any time. By knowing the distance of the end user from WLAN access points, location of the end user can be determined. Translating receiver Receive Signal Strength to distance relies on assuming a specific radio channel model. Ideally, if the radio channel model was exactly known, the exact distance of the end user to WLAN access points could be found.

Outdoor and indoor WLAN based positioning systems have been explored by couple of research labs, but none of them included speed and bearing estimation in their system. The most important research efforts in this area have been conducted by PlaceLab (www.placelab.com, a project sponsored by Microsoft and Intel), University of California San Diego ActiveCampus project (ActiveCampus—Sustaining Educational Communities through Mobile Technology, technical report #CS2002-0714), and the MIT campus wide location system, and it was evaluated through several small projects at Dartmouth college (e.g., M. Kim, J. J. Fielding, and D. Kotz, "Risks of using AP locations discovered through war driving").

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, *Proceedings of the International Workshop on Location and Context-Awareness* (*LoCA* 2005) at Pervasive 2005, May 2005, and Hazas, M., Scott, J., Krumm, J.: Location-Aware Computing Comes of Age. IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy.

These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario. The required accuracy of indoor WLAN based positioning systems, makes it hard to use radio channel modeling and it is considered as a research topic in that domain. In addition, none of the WLAN based positioning systems to date have distinguished between access points, and current methods treat all WLAN access points the same.

Figure 1:
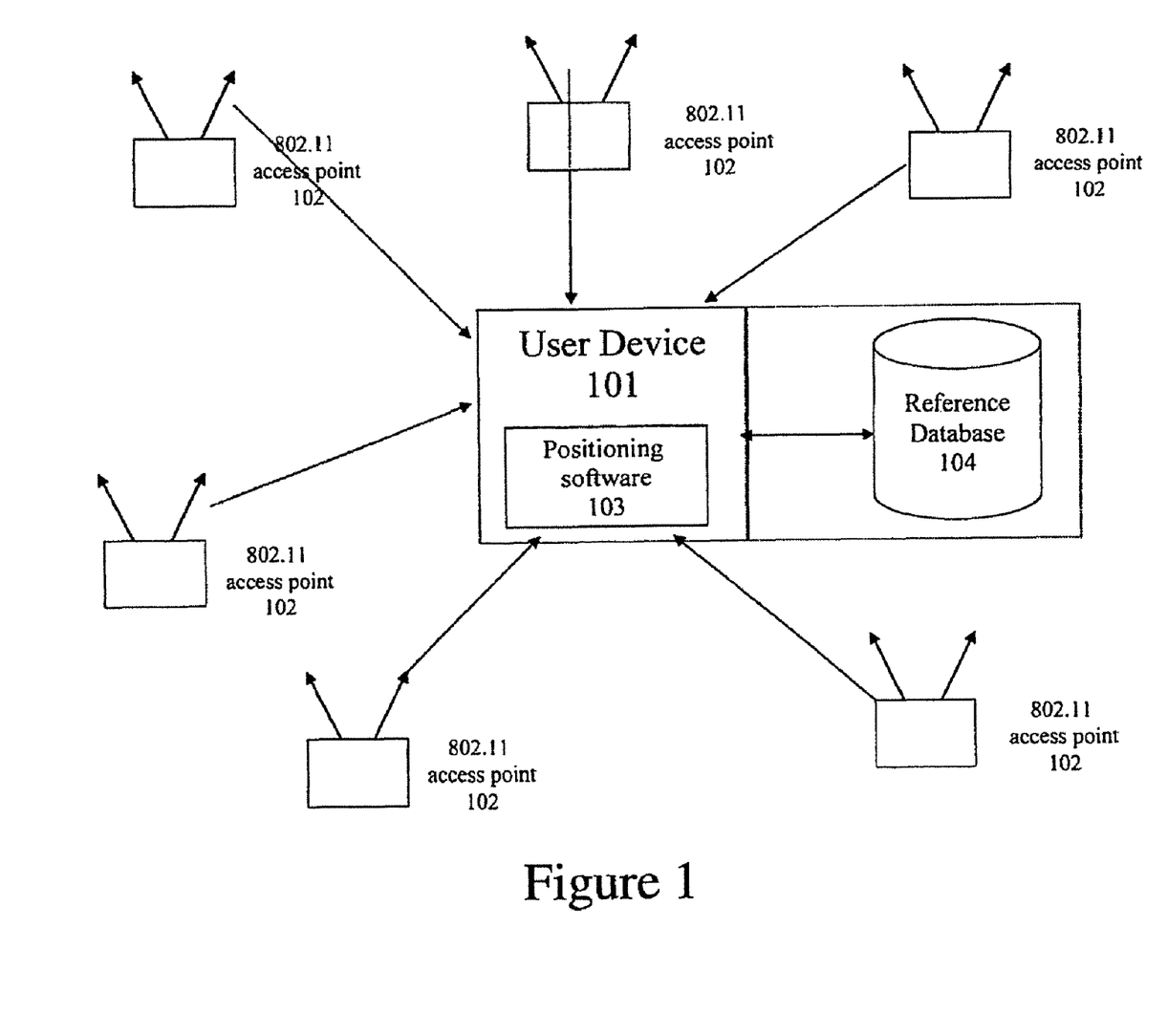
FIG. 1 depicts certain embodiments of a Wi-Fi positioning system.

FIG. 1 depicts a Wi-Fi positioning system (WPS). The positioning system includes positioning software [103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database [104] of access points, which may or may not reside on the device as well. The reference database contains the calculated geographic locations and power profile of all the access points the gathering system has collected. The power profile may be generated from a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

SUMMARY

The invention provides methods and systems for estimating position using WLAN (e.g., Wi-Fi) access point radio propagation characteristics in a WLAN location based service.

Aspects of the invention classifying WLAN access points based on a radio channel model can use any channel model, and the invention is independent of any specific channel model.

Under one aspect of the invention, a location-based services system has a plurality of Wi-Fi access points in a target area. The Wi-Fi access points are positioned at geographic locations and have signal coverage areas. A method of characterizing at least one of the Wi-Fi access points comprises determining the geographic location of the Wi-Fi access point, dividing the signal coverage area of the Wi-Fi access point into at least one section, and determining radio propagation characteristics for each section. The radio propagation characteristics of each section characterize a radio channel of the Wi-Fi access point, and the characterization can be used in a location algorithm.

Under another aspect of the invention, the signal coverage area is characterized as one section.

Under another aspect of the invention, the signal coverage is divided into more than one section. Under certain embodiments, radials emanating outward from the Wi-Fi access point form the sections. Under further embodiments, sections are formed based on a distance from the Wi-Fi access point. Under yet further embodiments, sections are formed based on both radials and distances from the Wi-Fi access point.

Under another aspect of the invention, a plurality of received signal power values within the signal coverage area is measured. Each received signal power value is measured at an associated position relative to the Wi-Fi access point. The sections are determined based on the plurality of received signal power values and associated positions.

Under another aspect of the invention, the radio propagation characteristics include a signal power-distance gradient.

Under another aspect of the invention, the signal power-distance gradient for each section is determined by measuring a plurality of received signal power values within the signal coverage area, each received signal power value being measured at an associated position relative to the Wi-Fi access point, performing a linear regression on the plurality of received signal power values and associated positions, and using a slope determined by the linear regression to calculate the signal power-distance gradient.

Under another aspect of the invention, the signal power-distance gradient for each section is determined by measuring a plurality of received signal power values within the signal coverage area, each received signal power value being measured at an associated position relative to the Wi-Fi access point. A distance corresponding to each of the signal power values is calculated, the distances being measured from the associated positions of the signal power values to the geographic locations of the Wi-Fi access points. An average radius of signal coverage is estimated using the standard deviation of the distances, and the average radius of signal coverage is used to calculate the signal power-distance gradient.

Under another aspect of the invention, the position of a Wi-Fi enabled device is estimated by the Wi-Fi enabled device communicating with Wi-Fi access points within range of the Wi-Fi enabled device to cause the Wi-Fi access points to transmit signals. The Wi-Fi enabled device receives the signals transmitted by the Wi-Fi access points and identifies the Wi-Fi access points. Calculated locations and estimated radio propagation characteristics of the Wi-Fi access points are retrieved from a reference database using Wi-Fi access point identifiers. The calculated locations and the estimated radio propagation characteristics are used to estimate the position of the Wi-Fi enabled device.

DETAILED DESCRIPTION

Embodiments of the invention provide a methodology to classify WLAN access points based on their radio propagation characteristics in a WLAN based positioning system and to increase the accuracy of position, velocity and bearing estimations. Under certain embodiments, radio propagation characteristics of WLAN access points are estimated based on RSS samples in their coverage area. For example, radio propagation characteristics can be characterized by finding one or more signal power-distance gradients for at least one of the WLAN access points.

There are different physical phenomena that impact Received Signal Strength (RSS) variation in the dimensions of space and time. The RSS variation is categorized as either fast fading or slow fading. The techniques disclosed herein focus on estimating the slow fading characteristics of the RSS and also assess the estimation quality and quantify the estimation.

Embodiments of the present invention build on techniques, systems and methods disclosed in earlier filed applications, including but not limited to U.S. patent application Ser. No. 11/261,848, entitled Location Beacon Database, U.S. patent application Ser. No. 11/261,898, entitled Server for Updating Location Beacon Database, U.S. patent application Ser. No. 11/261,987, entitled Method and System for Building a Location Beacon Database, and U.S. patent application Ser. No. 11/261,988, entitled Location-Based Services that Choose Location Algorithms Based on Number of Detected Access Points Within Range of User Device, all filed on Oct. 28, 2005, the contents of which are hereby incorporated by reference in its entirety. Those applications taught specific ways to gather high quality location data for Wi-Fi access points so that such data may be used in location based services to determine the geographic position of a Wi-Fi-enabled device utilizing such services and techniques of using said location data to estimate the position of a system user. The present techniques, however, are not limited to systems and methods disclosed in the incorporated patent applications. Thus, while reference to such systems and applications may be helpful, it is not believed necessary to understand the present embodiments or inventions.

Figure 2:
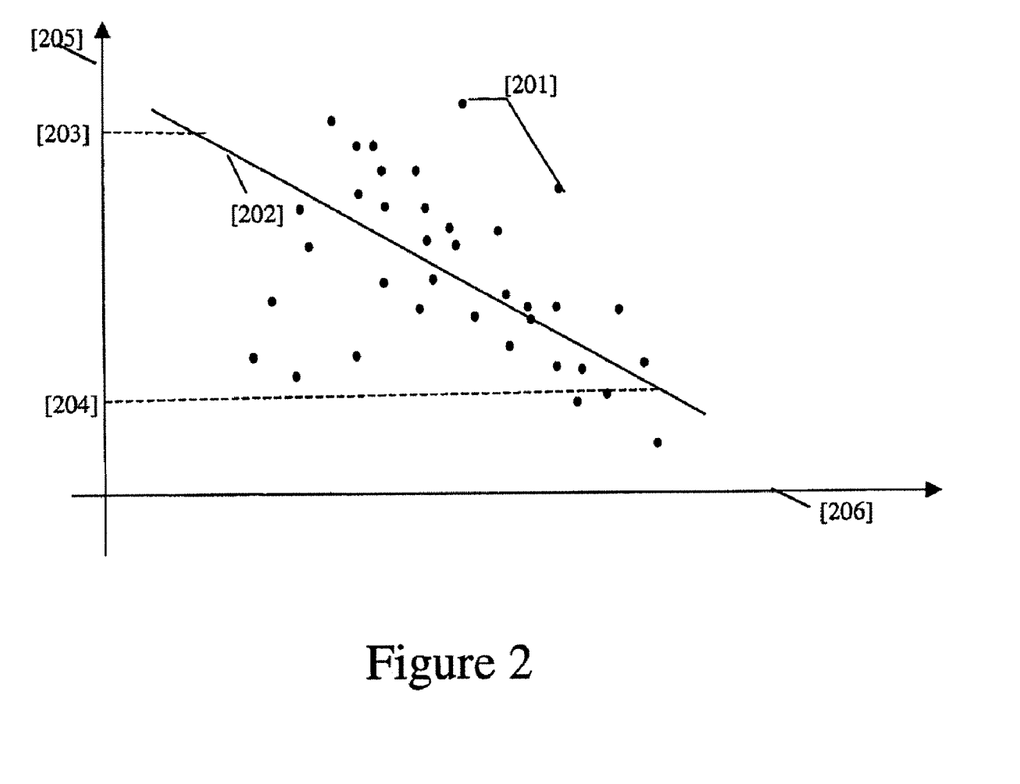
FIG. 2 depicts a line fit to RSS samples, defining an example access point coverage area according to certain embodiments of the invention.

FIG. 2 depicts an example of embodiments of the invention characterizing radio propagation characteristics of WLAN access points by estimating a signal power-distance gradient for a WLAN access point in a WLAN based positioning system. The coverage area of a WLAN access point may be used to find a signal power-distance gradient. The minimum RSS [204] is limited by sensitivity of the scanner. Whereas, the maximum RSS [203] may be assumed the same for all of the WLAN access points because the maximum transmit power is defined as part of the Wi-Fi standard. Therefore, the coverage area of a WLAN access point is directly a function of the signal power-distance gradient of the WLAN access point.

FIG. 2 represents RSS samples [201] as points on a graph plotting RSS power (in dB) [205] versus distance of the RSS sample from the access point (in dB) [206]. A signal power-distance gradient $\alpha$ can be determined by fitting a line [202] to the RSS sample points [201], where the slope of the line is equal to the signal power-distance gradient. Because a WLAN based positioning system according to embodiments of the invention use radio waves of public and private WLAN access points in order to continuously estimate position of a user, aspects of the invention increase the accuracy of location estimation by using individual radio propagation characteristics of each WLAN access point, rather than a standard value.

Under other embodiments of the present invention, the coverage area of a WLAN access point is divided into sectors, and radio propagation characteristics are determined for each sector, e.g., a signal power-distance gradient is found for each sector. For example, in a metropolitan area, the radio propagation characteristics of an access point is not symmetric across its coverage area, i.e., the characteristics vary in different directions. Under embodiments of the invention, the 360 degree coverage area of the WLAN access point is divided into multiple sectors when coverage of the WLAN access point is not symmetric in all of the directions. The sectors may be divided according to radials emanating from the estimated location of the WLAN access point.

For simplicity, the sectors may be referenced from the same axis, for example, the north direction. Because the radio propagation characteristics of the WLAN access point needs to be found in each direction, there is a need to have enough RSS samples in each sector. Based on the statistics of the number of RSS power samples and their distribution, a number of sectors can be determined. Increasing the number of sectors increases the resolution of the radio propagation characteristics because averaging is occurred in a smaller sector. However, this is conditioned on having enough RSS samples to be able to estimate the radio propagation characteristics, e.g., power distance gradient, in each sector accurately.

Figure 3:
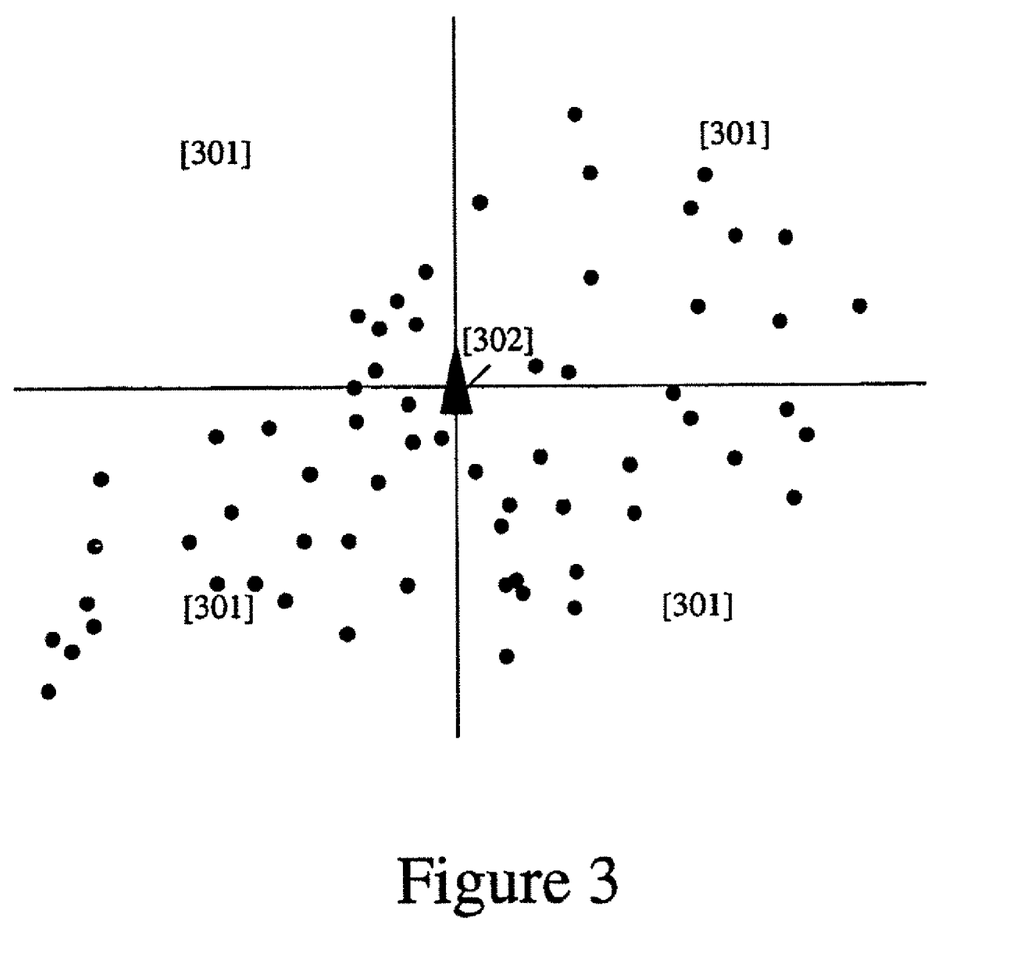
FIG. 3 depicts dividing a coverage area of an access point into sectors according to certain embodiments of the invention.

FIG. 3 depicts an example of a WLAN access point [302] with its coverage area divided into four sectors [301]. The number of sectors varies from one WLAN access point to another, and it is selected for each WLAN access point separately based on the number of RSS samples and the RSS sample distribution in the WLAN access point coverage area. For example, in a metropolitan WLAN based positioning system, if the RSS samples for a given WLAN access point are non-uniform, then a relatively low number of sectors will be used for that WLAN access point. If RSS samples from the coverage area of a WLAN access point indicate different radio propagation characteristics, such as different signal power-distance gradients, in different directions, the coverage area of that WLAN access point is divided into multiple sectors.

For example, if a WLAN access point is facing an open area from one side and residential area from the other side, the coverage area can be divided into two sectors, and corresponding radio propagation characteristics may be determined for each sector. In at least one embodiment, for the general case of a metropolitan positioning system, a useful maximum number of sectors is in the range of four to six, because distinguishing between sectors for higher numbers of sectors may be of limited value. The minimum number of sectors can be as small as one, which means, for example, that one signal power-distance gradient is used for the whole coverage area.

After selecting number of sectors, radio propagation characteristics need to be calculated for each sector. Note that if number of RSS samples in one sector is not enough to estimate radio propagation characteristics in that sector, the average of the characteristics of the adjacent sectors may be used.

Under one embodiment of the invention, the radio propagation characteristics of a WLAN access point can be presented by a piecewise linear estimation. This may be accomplished by dividing the coverage area of the WLAN access point into multiple tiers and finding the radio propagation characteristics for each tier. This method can be used to increase the accuracy of RSS power to distance translation, e.g., when a WLAN access point coverage area consists of indoor and outdoor environments. Thus, this approach may be used to capture indoor and outdoor radio propagation characteristics differently by estimating a signal power-distance gradient for each tier.

Figure 4:
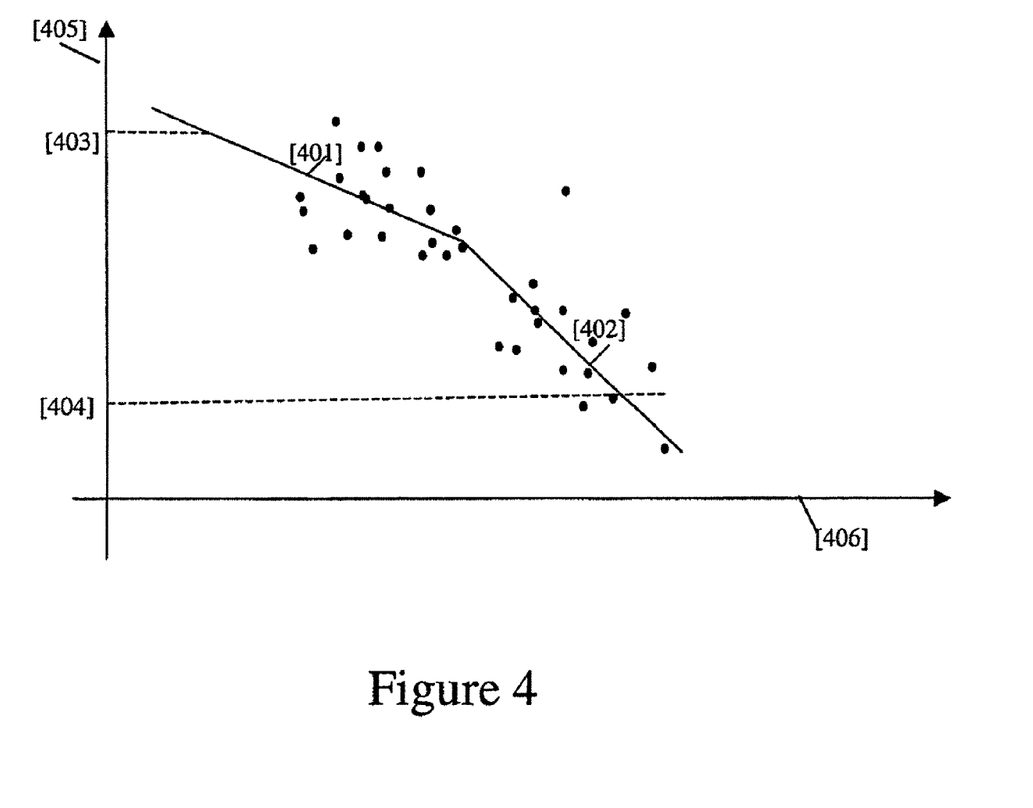
FIG. 4 depicts a coverage area of an access point characterized with multiple power distance gradients according to certain embodiments of the invention.

FIG. 4 depicts an example of RSS samples for a WLAN access point in which the RSS samples can be presented clearly with two signal power-distance gradient values, one for use in the vicinity of the access point and the other for use at greater distances. FIG. 4 present RSS samples plotted as RSS power [405] versus distance [406] from the WLAN access point. The minimum scanner sensitivity [404] and maximum RSS value [403] are also shown. The coverage area of a WLAN access point is divided into multiple tiers when it is necessary. For example, if it is known that the coverage area of a WLAN access point is partly indoor and partly outdoor. Alternatively, the need to use the multi-tier approach to characterize coverage area of a WLAN access point may be detected by observing the RSS samples. A sharp change in the average decay of power values of the RSS samples, as illustrated by the differing slopes of a first cluster of RSS samples [401] and a second cluster of RSS samples [402], may indicate an environment change. A useful number of tiers has been found to be two.

Figure 5:
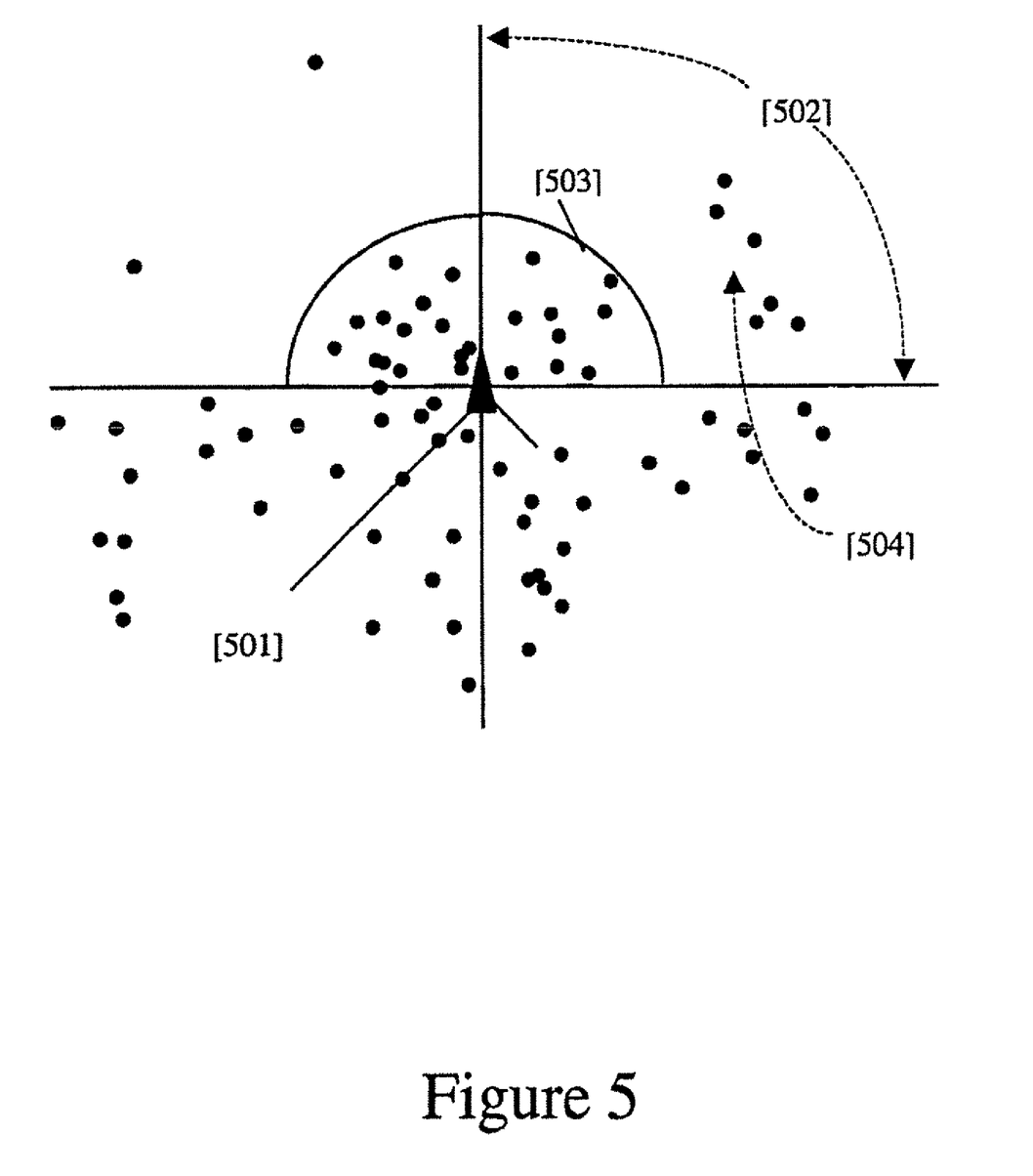
FIG. 5 depicts a coverage area of an access point divided into multiple sectors and tiers according to certain embodiments of the invention.

FIG. 5 depicts an embodiment dividing the coverage area into a combination of sectors and tiers. In this case, the coverage area of a WLAN access point [501] can be divided to multiple sectors [502], and each sector can be further divided into multiple tiers [503], thus forming multiple sections [504]. The number of sectors and tiers, and the corresponding radio propagation characteristics, are considered part of the attributes of each WLAN access point when it is stored in the reference database [104], and these attributes are retrieved by the end user and used to estimate the user location.

Under one embodiment of the invention, the radio propagation characteristics of a WLAN access point may be estimated using the signal power-distance gradient for each sector, which is found based on RSS samples in the designated area. One possible approach to finding a signal power-distance gradient is by fitting a line to RSS samples with power (in dB) as a function of distance (in dB), as was discussed above in connection with FIG. 2. Due to power variation in a metropolitan indoor and outdoor WLAN positioning system, this method may have low accuracy for a typical number of RSS samples in a typical metropolitan environment.

Under one aspect of the invention, a novel approach to finding a signal power-distance gradient is disclosed, wherein the average radius of the coverage area of a WLAN access point is calculated and used to estimate the signal power-distance gradient. The average radius of coverage area can be used as an indictor of the signal power-distance gradient because the signal power-distance gradient is the ratio of RSS power to distance from the WLAN access point. Referring again to FIG. 2, if the points corresponding to the minimum RSS [204] and the maximum RSS [203] are considered, the power difference between the minimum and the maximum power points are the same for all the access points, because the minimum power is bounded by the sensitivity of the scanner and the maximum power is the maximum access point transmit power. The sensitivity of the scanners collecting the RSS samples is nearly identical in the systematic scanning scenario, and the maximum transmit power is limited by, e.g., the FCC, for WLAN access points and can be assumed the same for all the access points. Therefore, the radius of coverage area is directly dependent on the signal power-distance gradient value.

In other words, the sensitivity of the scanner receiver limits the minimum RSS [204] which can be detected by the scanner. Therefore, the signal power-distance gradient value directly impacts the radius of coverage area of the WLAN access point. Because the receiver sensitivity is the same for all scanning devices taking RSS samples, the radius of coverage area of the WLAN access point can be used as an indicator of the value of signal power-distance gradient, as was shown in FIG. 2.

In order to find the radius of coverage area of the WLAN access point and avoid the impact of fast fading on the RSS power reading, and subsequently on the coverage, the standard deviation of the radius of coverage area instead of absolute radius of coverage area is used. In other words, absolute value of the radius of coverage area depends on a limited number of readings at the edge of the coverage, but standard deviation is calculated based on the total number of RSS samples and reduces the impact of power variation at the edge of the coverage area, while at the same time indicating the size of the coverage area.

Figure 6:
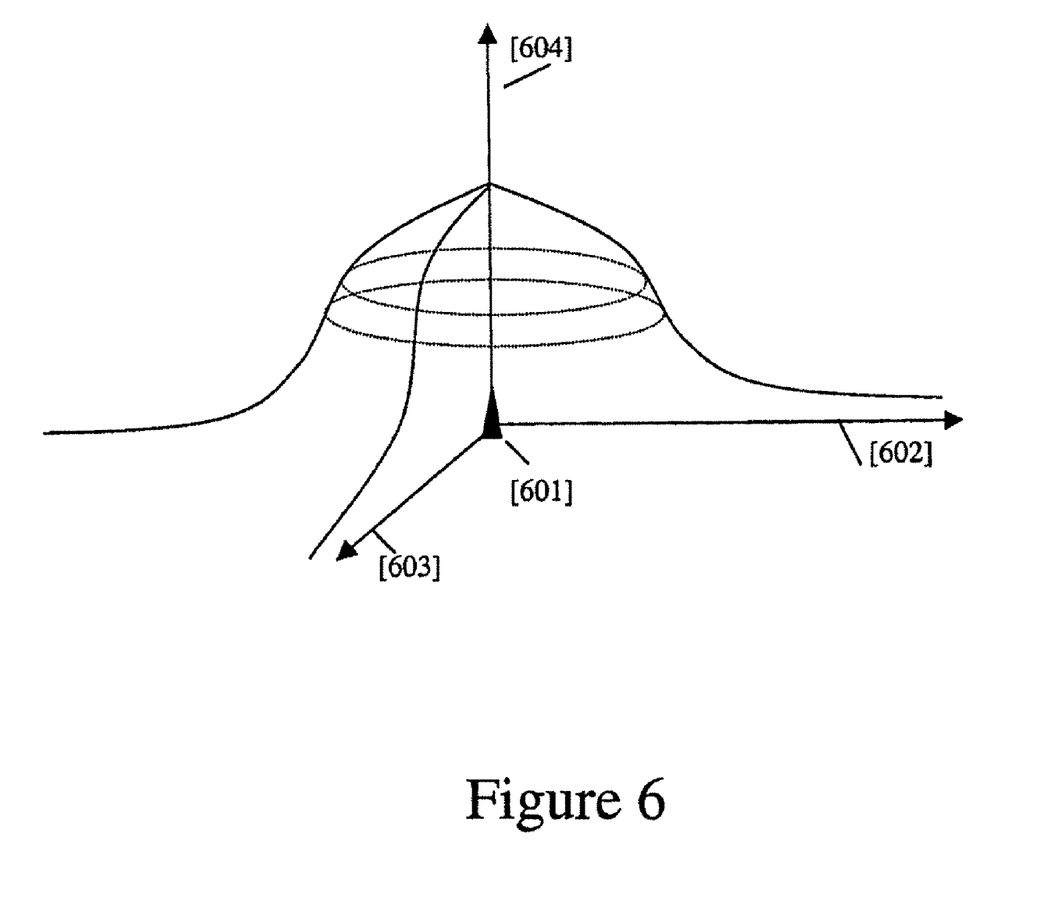
FIG. 6 depicts RSS sample statistics in a two dimensional surface identifying the radius of the coverage area according to certain embodiments of the invention.

FIG. 6 depicts a coverage area of an access point [601] and power distribution [604] as a function of the latitude [602] and longitude [603] of the power readings. The standard deviation of RSS samples referenced to the location of access point [601] is directly correlated to the average radius of the coverage.

When the coverage area is not divided into multiple sections, and the whole area is considered as one area, the standard deviation is calculated based on all of the RSS readings around the access point. If the total number of RSS samples of the access point is denoted by N and corresponding latitude and longitude of RSS sample i are denoted by $(lat_i, long_i)$, the standard deviation, $\sigma$, of the radius of coverage area is calculated as follows:

$$\sigma = \sqrt{\sigma_x^2 + \sigma_y^2},$$

In which $$\sigma_x^2 = \frac{\sum_{i=1}^{N}(d_{xi})^2}{N-1}, N > 1$$

$$\sigma_x = 0, N = 1,$$

$$\sigma_y^2 = \frac{\sum_{i=1}^{N}(d_{yi})^2}{N-1}, N > 1$$

$$\sigma_y = 0, N = 1,$$

The variables $d_{xi}$ and $d_{yi}$ are the distances of power sample from the WLAN access point in the X and Y directions in Cartesian coordinates. The standard deviation calculation can be simplified as follows:

$$\sigma = \sqrt{\sigma_{lat}^2 + \sigma_{long}^2},$$

In which $$\sigma_{lat}^2 = \frac{\sum_{1}^{N}(lat_i - lat)^2}{N-1}, N > 1$$

$$\sigma_{lat} = 0, N = 1,$$

$$\sigma_{long}^2 = \frac{\sum_{1}^{N}(long_i - long)^2}{N-1}, N > 1$$

$$\sigma_{long} = 0, N = 1,$$

In this equation, (lat, long) is the calculated location of the WLAN access point. The average radius of coverage is calculated based on a Cartesian presentation of location. Calculation of the radius of coverage can also be simplified by considering latitude and longitude without converting them to Cartesian coordinates. If the coverage area is divided into multiple sectors, the standard deviation is calculated based on the distance of RSS samples from the WLAN access point, which can be considered in one dimension. Therefore, the standard deviation is calculated as follows:

$$\sigma = \sqrt{\frac{\sum_{1}^{N}(d_i)^2}{N-1}}, N > 1$$

$$\sigma = 0, N = 1,$$

In which $d_i$ is distance of power sample i from the WLAN access point.

The standard deviation of a radius of the coverage area is translated to the signal power-distance gradient using following equation:

$$\alpha = \alpha_{min}, \text{ if } (\sigma > \sigma_{max})$$

$$\alpha = \alpha_{max}, \text{ if } (\sigma < \sigma_{min})$$

$$\alpha = \alpha_{max} + (\alpha_{min} - \alpha_{max})\left(\frac{\log(\sigma) - \log(\sigma_{min})}{\log(\sigma_{max}) - \log(\sigma_{min})}\right), \text{ otherwise.}$$

In which $\alpha_{min}$ and $\alpha_{max}$ are minimum and maximum values of the signal power-distance gradient, and $\sigma_{min}$ and $\sigma_{max}$ are the minimum and maximum thresholds of the WLAN access point coverage. The values of $\alpha_{min}$ and $\alpha_{max}$ are dependent on the environment in which the WLAN devices are operating. One example of useful values for the minimum and maximum signal power-distance gradients for a metropolitan WLAN based positioning systems are as follows:

$$\alpha_{min}=2,$$

$$\alpha_{max}=6.$$

In this case, the maximum value of $\alpha$ is the typical maximum value for an urban area.

The minimum and the maximum values of the standard deviation are found based on typical minimum and maximum radii of coverage of WLAN access points, which may be found empirically. Useful minimum and maximum radii of coverage of WLAN APs are 60 and 700 meters, respectively. If the coverage is considered as five-sigma value, the minimum and maximum sigma value can be calculated.

In the case of multi tier approach, after finding the boundary of each tier, the signal power-distance gradient for each tier may be found by fitting a line to RSS samples within each tier using the method discussed in connection with FIG. 2 above. The standard deviation approach cannot be used, because the minimum and maximum power values are not known for each tier, as it was known for the whole coverage area. FIG. 4 depicts an example of a multi-tier access point and illustrates the exact transition point from the first cluster of RSS samples [401] and the second cluster of RSS samples is not known, as some of the RSS samples considered to belong to the first cluster [401] may actually belong to the second cluster [402]. Estimating this transition point introduces error using the standard deviation approach.

According to embodiments of the invention, signal power-distance gradient(s) for each WLAN access point may be used by the user to find its distance to each WLAN access point in range and consequently locate itself. Signal power-distance gradient can be used in the following equation to find the distance:

$$d = \sqrt[\alpha]{\frac{K}{P_{RSS}}}$$

The notation $P_{RSS}$ is the received power from a WLAN access point in watts and K is a constant number aggregating all other parameters. The value of d can be normalized to K by assuming K equal to one without sacrificing accuracy. Assuming K equal to one is the same as changing the scale of the distance measurement, and because it can be made the same for all access points, normalizing K does not impact the accuracy of position estimation.

Under aspects of the invention, the location of access point, (lat, long), may be calculated. If the exact location of an access point is not known, the RSS samples and their corresponding locations can be used to estimate the location of the access point. For example, location of the access point can be found by finding the center of power readings as follows:

$$lat = \frac{\sum_{i=1}^{N} lat_i}{N}$$

$$long = \frac{\sum_{i=1}^{n} log_i}{N}$$

Wherein the total number of power samples is equal to N.

Charactering the unique radio propagation characteristics of each WLAN access point in a location system, instead of using one set of characteristics for all the WLAN access points, increases the accuracy of position, speed of travel, and direction of travel estimations in a WLAN based positioning system. One example of a positioning algorithm is show below, which illustrates the use of signal power-distance gradients estimated according to embodiments of the invention. This example is a triangulation algorithm weighted according to the distance of the user from the access points.

If a user detects N number of access points with a corresponding RSS value of $P_i$, a signal power-distance gradient of $\alpha_i$, a latitude of $lat_i$, and a longitude of $long_i$, the distance of the user to the access points is calculated as follows:

$$d_i = \sqrt[\alpha_i]{\frac{1}{P_i}}$$

Latitude and longitude of the user, $U_{lat}$, and $U_{long}$, can be found as follows:

$$U_{lat} = \frac{\sum_{i=1}^{N} \frac{lat_i}{d_i}}{\sum_{i=1}^{N} \frac{1}{d_i}}$$

$$U_{long} = \frac{\sum_{i=1}^{N} \frac{long_i}{d_i}}{\sum_{i=1}^{N} \frac{1}{d_i}}$$

Under another aspect of the invention, the RSS value reading by the end user can be normalized, and the RSS power reading can be used to select the correct value of radio propagation characteristics, e.g., a signal power-distance gradient, in the case of multi tier approach. When a coverage area is divided into multiple tiers with piecewise linear estimation of the coverage area, the user must be able to determine in which tier he is located, and use the radio propagation characteristics. In this case, there is a need to normalize the RSS power reading across different hardware and different Wi-Fi receiver implementations. In order to normalize the RSS power reading, the minimum and the maximum power sensitivity of the user's device are mapped to the dynamic power range of the scanner used to supply data to the reference database [104].

If the scanners used to supply data to the reference database do not have a standard dynamic power range, the same normalization method may be used to map the individual dynamic ranges of the different scanning devices to a standard dynamic range. Thus, this method can be used in a WLAN positioning system when the hardware differs between scanners. In this case, a standard dynamic range for the power is selected by selecting a minimum and a maximum value for power reading, and all readings from all the different devices are mapped to this range.

For example, if the standard minimum power and the maximum power values are set to −100 dBm and −40 dBm, respectively, and a user device's minimum and maximum range is between −90 dBm and −60 dBm, the power readings of the user is normalized as follows:

$$P_{new} = [P_{old} - (-90)]\left(\frac{-40 - (-100)}{-60 - (-90)}\right) + (-100)$$

It will be appreciated that the scope of the present invention is not limited to the above-described embodiments, but rather is defined by the appended claims, and these claims will encompass modifications of and improvements to what has been described.

What is claimed is:

1. A method of characterizing at least one WLAN access point, using the coverage area of the WLAN access point, so that the characterization may be used later to effectively weigh signals transmitted by said WLAN access point when performing a location estimation, the method of characterization comprising:
determining the geographic location of the at least one WLAN access point;
for each WLAN access point, measuring a plurality of power values for signals transmitted by the corresponding WLAN access point, each power value being measured at a position relative to each corresponding WLAN access point;
determining a signal coverage area of each WLAN access point based on said measured plurality of power values;
dividing the signal coverage area of the WLAN access point into at least one section;
determining radio propagation characteristics for each section; and
assigning a weight to each section based on the coverage areas of the WLAN access points, where sections having relatively small coverage areas are assigned a higher effective weight than sections having relatively large coverage areas, so that the location estimation can bias its estimate of position to rely on signals detected from the WLAN access points with relatively smaller coverage areas.

2. The method of claim 1, wherein at least two sections are divided according to at least two radials from the WLAN access point.

3. The method of claim 2, wherein the number of radials is six or less.

4. The method of claim 1, wherein the sections are divided according to at least one distance from the WLAN access point.

5. The method of claim 4, wherein the number of distances is one.

6. The method of claim 1, wherein the sections are divided according to at least two radials and at least one distance from the WLAN access point.

7. The method of claim 1, wherein the radio propagation characteristics include a signal power-distance gradient.

8. The method of claim 7, wherein the signal power-distance gradient for each section is determined by a method comprising:
performing a linear regression on the plurality of power values and associated positions; and
using a slope determined by the linear regression to calculate the signal power-distance gradient.

9. The method of claim 7, wherein the signal power-distance gradient for each section is determined by the method comprising:
calculating a distance corresponding to each of the power values, the distances being measured from the associated positions of the power values to the geographic locations of the WLAN access points;
estimating a radius of signal coverage using the standard deviation of the distances; and
using the radius of signal coverage to calculate the signal power-distance gradient.

10. The method of claim 9, wherein the standard deviation of the distances, σ, is calculated according to equations having the form $$\sigma = \sqrt{\frac{\sum_{1}^{N}(d_i)^2}{N-1}} \quad N > 1$$
$$\sigma = 0, N = 1,$$

wherein:
$d_i$ is the distance of the associated position of received power value i from the location of the WLAN access point; and
N is the number of power values.

11. The method of claim 9, wherein the signal power-distance gradient, α, is calculated using equations having the form $$\alpha = \alpha_{min}, \text{ if } (\sigma > \sigma_{max})$$
$$\alpha = \alpha_{max}, \text{ if } (\sigma < \sigma_{min})$$
$$\alpha = \alpha_{max} + (\alpha_{min} - \alpha_{max})\left(\frac{\log(\sigma) - \log(\sigma_{min})}{\log(\sigma_{max}) - \log(\sigma_{min})}\right),$$
$$\text{if } (\sigma_{min} < \sigma \leq \sigma_{max})$$

wherein:
$\sigma_{min}$ is a minimum signal coverage threshold;
$\sigma_{max}$ is a maximum signal coverage threshold;
σ is the average radius of signal coverage;
$\alpha_{min}$ is a minimum signal power-distance gradient; and
$\alpha_{max}$ is a maximum signal power-distance gradient.

12. The method of claim 11, wherein:
a five-sigma value of $\sigma_{min}$ is about 60 meters;
a five-sigma value of $\sigma_{max}$ is about 700 meters;
$\alpha_{min}$ is 2 dBWatts/dBMeters; and
$\alpha_{max}$ is 6 dBWatts/dBMeters.

13. A method for estimating the position of a WLAN enabled device using qualitative data related to one or more characteristics of a signal coverage area of a WLAN access point, the method comprising:

receiving one or more signals transmitted by the WLAN access points;

identifying the WLAN access points;

retrieving previously calculated locations of the WLAN access points and previously calculated weights assigned to the WLAN access points from a reference database, wherein the weights correspond to characteristics of a corresponding coverage area of each WLAN access point, including a plurality of measured power values for each access point; and using the calculated locations and the calculated weights to estimate the position of the WLAN enabled device, wherein WLAN access points having relatively small coverage areas are assigned a higher effective weight than WLAN access points having relatively large coverage areas and the position estimate of the WLAN enabled device will be biased to rely more heavily rely on signals detected from the WLAN access points with relatively smaller coverage areas, even if said signals are detected with relatively weaker power than signals detected from WLAN access points with larger coverage areas and relatively higher power.

14. The method of claim 13, wherein at least one of the WLAN access points has a radius of coverage, the radius of coverage having at least one section, each section having corresponding weights, where the weights correspond to characteristics of the coverage area of the WLAN access point.

15. A method of characterizing WLAN access points in order to increase the accuracy of position, velocity and bearing estimation techniques based on signals received from those access points by classifying the WLAN access points based on coverage areas of the WLAN signals emitted by the WLAN access points, the method of characterizing comprising:

measuring a series of WLAN signals of each WLAN access point;

determining a coverage area of each WLAN access point based on its corresponding series of signals; and assigning a weight to each WLAN access point based on the coverage areas in which WLAN access points having relatively small coverage areas are assigned a higher effective weight than WLAN access points having relatively large coverage areas, so that at least one of position, velocity, and bearing estimation techniques will bias their estimates of position, velocity, and bearing, respectively, to more heavily rely on signals detected from the WLAN access points with relatively smaller coverage areas.

16. The method of claim 15, wherein determining the coverage area comprises:

calculating a plurality of distances corresponding to each received signal within the coverage area of the WLAN access point, the distances being measured from the associated position relative to the WLAN access point; and determining an average radius of coverage of the WLAN access point based on the plurality of distances from the access point.

17. The method of claim 16, wherein determining the coverage area comprises:

determining the standard deviation of the coverage area in the WLAN access point based on the plurality of distances.

18. The method of claim 16 further comprising:

determining a differential of a power value in dB of the received signal and the distance in dB from the WLAN access point at each of the plurality of distances.

19. The method of claim 15, wherein the weight of the WLAN access point is assigned using a power-distance gradient of the WLAN access point, wherein a larger power-distance gradient corresponds to a higher weight and a smaller power-distance gradient corresponds to a smaller weight.

20. The method of claim 15, further comprising:

dividing the coverage area into a plurality of sections based on the series of signals and assigning a weight to each of the plurality of sections, wherein the weight is used as a characteristic of the section in the position, velocity, and bearing estimation techniques.

21. A method of characterizing WLAN access points in order to increase the accuracy of position, velocity and bearing estimation techniques based on signals received from those access points by classifying the WLAN access points based on coverage areas of the WLAN signals emitted by the WLAN access points, the method of characterizing comprising:

measuring a series of power values of the WLAN signal of the WLAN access point at a plurality of distances from the WLAN access point;

determining a coverage area of the WLAN access point based on the series of power values at the plurality of distances; and assigning a weight to the WLAN access point based on the coverage area, wherein the weight of the WLAN access point is assigned using the differential of the power in dB and the distance in dB from the WLAN access point, wherein a larger differential corresponds to a higher weight and a smaller differential corresponds to a smaller weight, so that position, velocity, and bearing estimation techniques will bias their estimates of position, velocity, and bearing to more heavily rely on signals detected from the WLAN access points with a relatively larger differential.

22. A method of characterizing WLAN access points in order to increase the accuracy of position, velocity, and bearing estimation techniques based on signals received from those access points by classifying the WLAN access points based on power-distance gradients of the WLAN signals emitted by the WLAN access points, the method of characterizing comprising:

measuring a series of WLAN signals of each WLAN access point;

determining a power-distance gradient of each WLAN access point based on its corresponding series of signals; and assigning a weight to each WLAN access point based on the power-distance gradients in which WLAN access points having relatively larger power-distance gradients are assigned a higher effective weight than WLAN access points having relatively smaller power-distance gradients, so that at least one of position, velocity, and bearing estimation techniques will bias their estimates of position, velocity, and bearing, respectively, to more heavily rely on signals detected from the WLAN access points with relatively larger power-distance gradients.

* * * * *